(12) United States Patent
Yamazaki et al.

(10) Patent No.: US 10,834,710 B2
(45) Date of Patent: Nov. 10, 2020

(54) RADIO TERMINAL AND METHOD (71) Applicant: KYOCERA Corporation, Kyoto (JP)

(72) Inventors: Chiharu Yamazaki, Tokyo (JP); Hiroyuki Urabayashi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 31 days.

(21) Appl. No.: 16/320,249

(22) PCT Filed: Jul. 25, 2017

(86) PCT No.: PCT/JP2017/026843
§ 371 (c)(1),
(2) Date: Jan. 24, 2019

(87) PCT Pub. No.: WO2018/021298
PCT Pub. Date: Feb. 1, 2018

(65) Prior Publication Data
US 2019/0274131 A1 Sep. 5, 2019

(30) Foreign Application Priority Data

Jul. 28, 2016 (JP) .................................. 2016-149053

(51) Int. Cl.
*H04W 72/04* (2009.01)
*H04L 1/16* (2006.01)
(Continued)

(52) U.S. Cl.
CPC .......... *H04W 72/0413* (2013.01); *H04L 1/16* (2013.01); *H04W 28/04* (2013.01); *H04W 52/24* (2013.01);
(Continued)

(58) Field of Classification Search
None
See application file for complete search history.

(56) References Cited

U.S. PATENT DOCUMENTS

| 2012/0039279 A1* | 2/2012 | Chen ................ H04L 5/0055 370/329 |
| 2014/0200014 A1* | 7/2014 | Iwai ................. H04W 76/40 455/450 |

(Continued)

FOREIGN PATENT DOCUMENTS

| JP | 2013123158 A | 6/2013 |
| JP | 2014078998 A | 5/2014 |
| JP | 2014216819 A | 11/2014 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 3GPP TS 36.300 V13.3.0, Mar. 2016, pp. 1-295, Valbonne, France.

(Continued)

*Primary Examiner* — Jason E Mattis
*Assistant Examiner* — Hong Shao
(74) *Attorney, Agent, or Firm* — Studebaker & Brackett PC (57) ABSTRACT

A radio terminal according to one embodiment comprises: a controller configured to perform a process of: receiving, if the radio terminal is in a specific state different from an RRC connected state, multicast/broadcast data transmitted from a base station; and transmitting feedback information on the multicast/broadcast data to the base station. The controller is configured to autonomously determine a transmission parameter to be used for transmitting the feedback information and transmits the feedback information by using the determined transmission parameter.

12 Claims, 8 Drawing Sheets

(51) Int. Cl.
*H04W 28/04* (2009.01)
*H04W 52/24* (2009.01)
*H04W 88/02* (2009.01)
*H04W 4/06* (2009.01)

(52) U.S. Cl.
CPC .............. *H04W 88/02* (2013.01); *H04W 4/06* (2013.01); *H04W 72/044* (2013.01)

(56) References Cited

U.S. PATENT DOCUMENTS

| | | | |
|---|---|---|---|
| 2015/0003442 A1* | 1/2015 | Sun ....................... | H04L 5/0092 370/350 |
| 2016/0150487 A1* | 5/2016 | Aiba ................... | H04W 52/365 370/311 |
| 2016/0308684 A1* | 10/2016 | Zhu ..................... | H04W 72/005 |
| 2017/0126452 A1* | 5/2017 | Sandberg ............ | H04L 27/2613 |

OTHER PUBLICATIONS

LG Electronics, Discussion on UE feedback for DL multicast/broadcast, 3GPP TSG RAN Working Group 1 Meeting #85, R1-164537, May 23-27, 2016, pp. 1-5, Nanjing, China.
Ericsson, Uu Enhancements for V2X, 3GPP TSG RAN Working Group 1 Meeting #84bis, R1-162831; Apr. 11-15, 2016; pp. 1-3; Busan, South Korea.

* cited by examiner

| RSRP LOW | RSRP HIGH | TA VALUE |
|----------|-----------|----------|
| A | B | X |
| B | C | Y |

| RSRP LOW | RSRP HIGH | TIME RESOURCE | FREQUENCY RESOURCE |
|---|---|---|---|
| A | B | X | Z |
| B | C | Y | W |

RADIO TERMINAL AND METHOD

TECHNICAL FIELD

The present invention relates to a radio terminal in a mobile communication system, and a method.

BACKGROUND ART

In a mobile communication system, unicast (PTP: Point To Point) transmission is generally applied to a downlink between a radio terminal and a base station.

In the downlink unicast transmission, the radio terminal transmits feedback information on the downlink to the base station. The feedback information is delivery acknowledgment information (ACK/NACK) indicating whether or not downlink data was properly received, and channel state information (CSI) indicating a downlink channel state. The base station controls transmission of the downlink data, based on the feedback information.

In recent years, multicast/broadcast (PTM: Point To Multipoint) transmission attracts attention. In downlink multicast/broadcast transmission, the base station uses the same downlink radio resource to transmit the same downlink data (hereinafter, appropriately referred to as "multicast/broadcast data") to a plurality of radio terminals. The multicast/broadcast transmission can improve a utilization efficiency of the downlink radio resource as compared to the unicast transmission.

PRIOR ART DOCUMENT

Non-Patent Document

Non Patent Document 1: 3GPP Technical Specification "3GPP TS36.300 V13.3.0", March, 2016

SUMMARY OF THE INVENTION

A radio terminal according to one embodiment comprises: a controller configured to perform a process of: receiving, if the radio terminal is in a specific state different from an RRC connected state, multicast/broadcast data transmitted from a base station; and transmitting feedback information on the multicast/broadcast data to the base station. The controller is configured to autonomously determine a transmission parameter to be used for transmitting the feedback information and transmits the feedback information by using the determined transmission parameter.

A method according to one embodiment is a method for a radio terminal. The method comprises: if the radio terminal is in a specific state different from an RRC connected state, receiving multicast/broadcast data transmitted from a base station; autonomously determining a transmission parameter to be used for transmitting feedback information on the multicast/broadcast data; and transmitting the feedback information to the base station by using the determined transmission parameter.

DESCRIPTION OF THE EMBODIMENT (Mobile Communication System)

Hereinafter, the mobile communication system according to the embodiment will be described. The mobile communication system according to the embodiment is an LTE (Long Term Evolution) system based on 3rd Generation Partnership Project (3GPP) standard.

Figure 1:
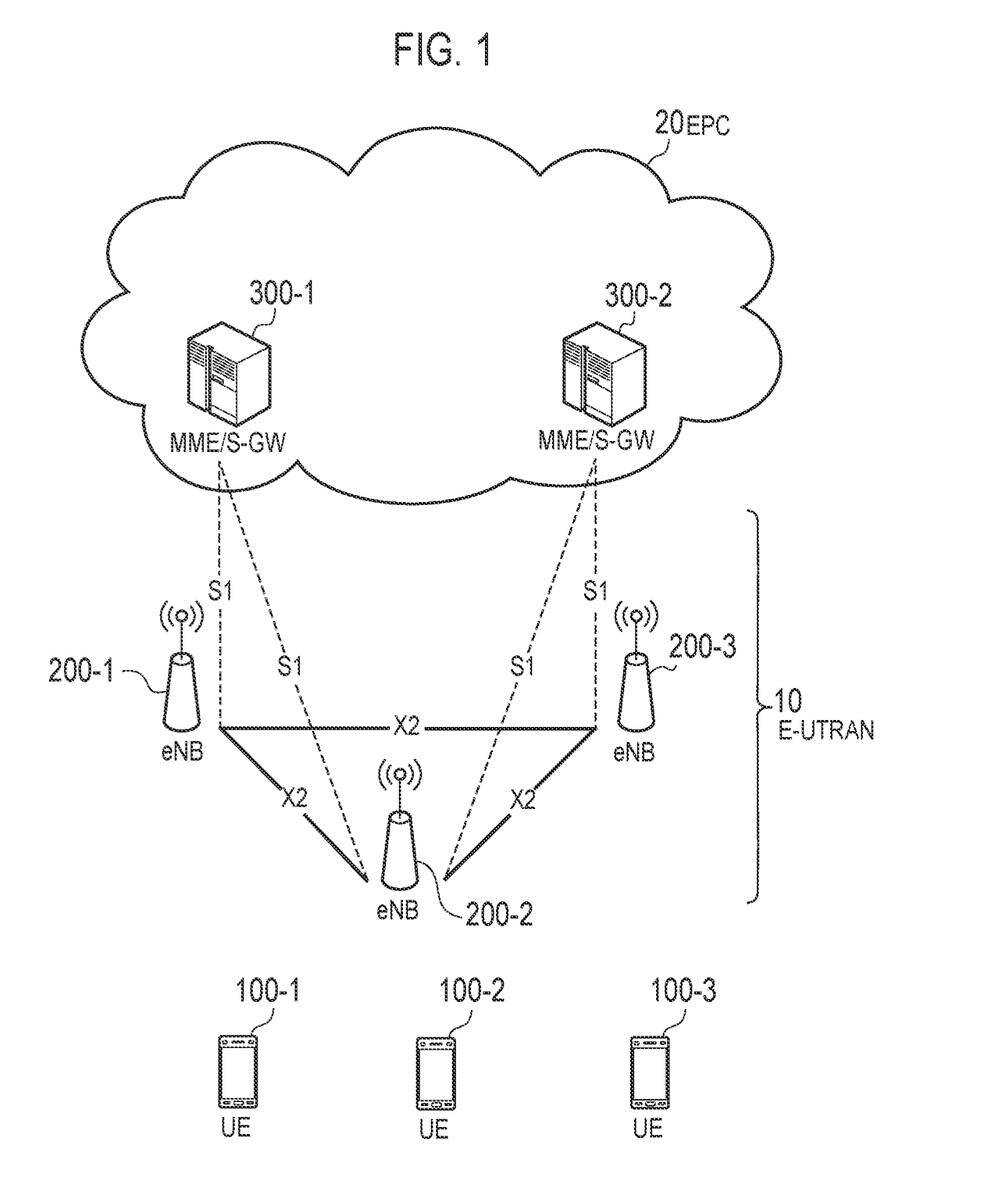
FIG. 1 is a configuration diagram of an LTE system according to an embodiment.

FIG. 1 is a configuration diagram of an LTE system. As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs200 are connected mutually via an X2 interface. Configuration of the eNB200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network.

Moreover, the E-UTRAN 10 may include an MCE (Multi-Cell/Multicast Coordinating Entity) 11. The MCE 11 is connected to the eNB 200 via a M2 interface and is connected to the MME 300 via a M3 interface. The MCE 11 performs MBSFN radio resource management/allocation and the like.

The EPC 20 may include an MBMS GW (Multimedia Broadcast Multicast Service Gateway). The MBMS GW is connected to the eNB 200 via a M1 interface, connected to the MME 300 via a Sm interface, and connected to a BM-SC (described later) via a SG-mb interface and a SGi-mb interface. The MBMS GW plays a role like the S-GW for MBMS, and performs IP multicast data transmission and session control to the eNB 200.

The EPC 20 may include a BM-SC (Broadcast Multicast Service Center). The BM-SC is connected to the MBMS GW via the SG-mb and SGi-mb interfaces, and is connected to the P-GW via the SGi interface. The BM-SC plays a role like the P-GW for MBMS, mainly manages and allocates TMGI (Temporary Mobile Group Identity).

Further, a GCS AS (Group Communication Service Application Server) may be provided in a network (i.e., the Internet) outside the EPC 20. The GCS AS is an application server for group communication. The GCS AS is connected to a BM-SC via a MB2-U interface and a MB2-C interface, and is connected to a P-GW via a SGi interface. The GCS AS performs group management and data distribution (including determination of whether to use MBMS or whether to use unicast) in group communication and the like.

Figure 2:
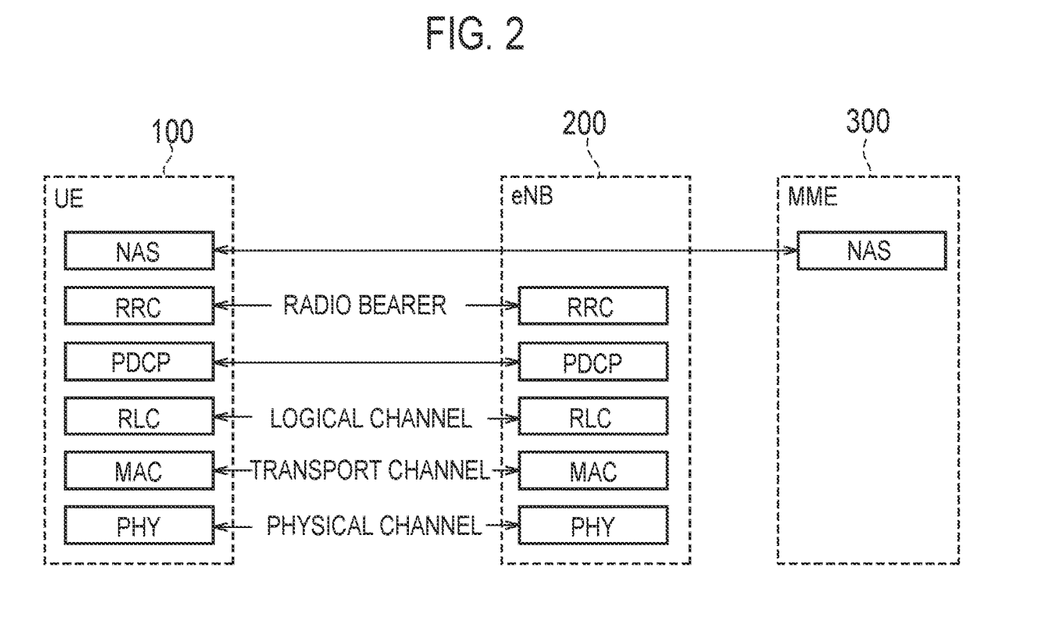
FIG. 2 is a protocol stack diagram of a radio interface according to the embodiment.

FIG. 2 is a protocol stack diagram of a radio interface in the LTE system. As illustrated in FIG. 2, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 3:
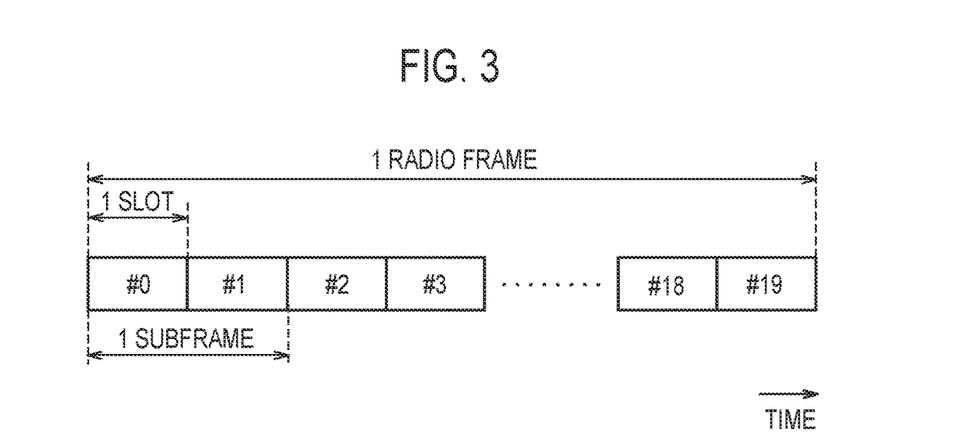
FIG. 3 is a configuration diagram of a radio frame according to the embodiment.

FIG. 3 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 3, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a control signal. Furthermore, the other portion of each subframe is a region available as a physical downlink shared channel (PDSCH) for mainly transmitting downlink data. Furthermore, in each subframe, a downlink reference signal such as a cell specific reference signal (CRS) is arranged.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data. Furthermore, in each subframe, an uplink reference signal such as a sounding reference signal (SRS) is arranged.

(Configuration of Radio Terminal)

Figure 4:
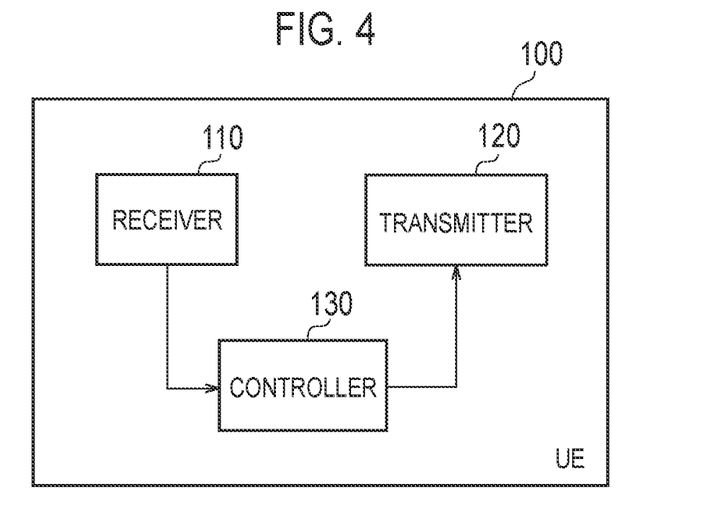
FIG. 4 is a block diagram of a UE according to the embodiment.

FIG. 4 is a block diagram of a configuration of the UE 100 (radio terminal). As illustrated in FIG. 4, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

The UE 100 may comprise a user interface and a battery. The user interface is an interface with a user possessing the UE 100, and includes, for example, a display, a microphone, a speaker, various buttons, and the like. The user interface receives an operation from the user and outputs a signal indicating the content of the operation to the controller 130. The battery stores electric power to be supplied to each block of the UE 100.

(Configuration of Base Station)

Figure 5:
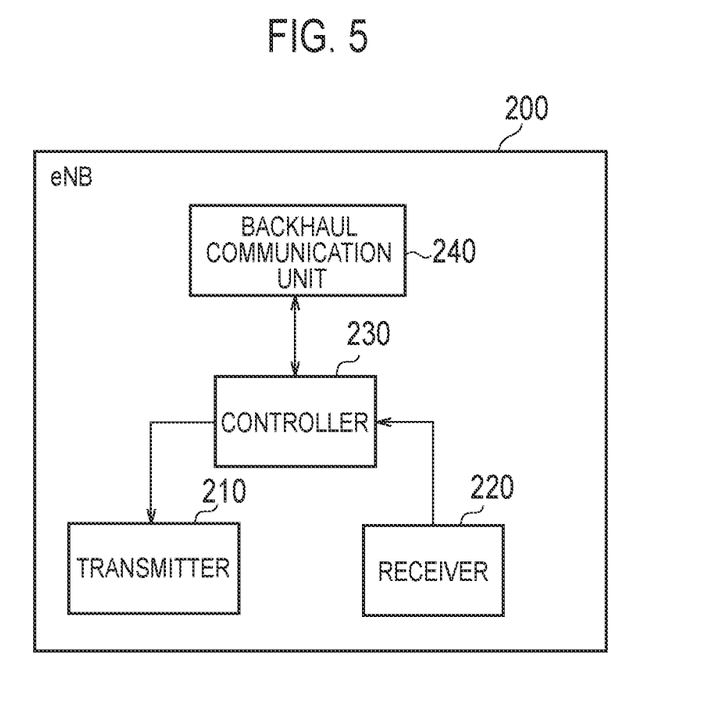
FIG. 5 is a block diagram of an eNB according to the embodiment.

FIG. 5 is a block diagram of the eNB 200 (base station). As illustrated in FIG. 5, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 130 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is used for backhaul communication with other eNB 200s and the aforementioned network entity.

(Unicast Transmission)

In the LTE system, unicast (PTP: Point To Point) transmission is generally applied to the downlink between the UE 100 and the eNB 200. In the downlink unicast transmission, the eNB 200 controls transmission of downlink data to the UE 100, based on the feedback information from the UE 100. The UE 100 transmits the feedback information on the downlink to the eNB 200. The feedback information is delivery acknowledgment information (ACK/NACK) and channel state information (CSI).

In the downlink, the eNB 200 transmits a downlink control signal to the UE 100 by using the PDCCH, and transmits the downlink control signal and/or the downlink data to the UE 100 by using the PDSCH. The downlink control signal carried by the PDCCH includes uplink SI (Scheduling Information), downlink SI, and a TPC bit. The uplink SI is scheduling information related to an allocation of an uplink radio resource, and the downlink SI is scheduling information related to an allocation of a downlink radio resource. The TPC bit is information for instructing an increase or decrease in the uplink transmission power. In order to identify a UE 100 to which the downlink control signal is transmitted, the eNB 200 includes, into the downlink control signal, a CRC bit scrambled by an identifier (Radio Network Temporary ID (RNTI)) of the UE 100 to which the control signal is transmitted. Each UE 100 descrambles, by the RNTI of the UE, the CRC bit of the downlink control signal that may be addressed to the UE so as to perform blind decoding of the PDCCH to detect the downlink control signal addressed to the UE. The PDSCH carries the data by the downlink radio resource (resource block) indicated by the downlink SI.

In the uplink, the UE 100 transmits the uplink control signal to the eNB 200 by using the PUCCH, and transmits the uplink control signal and/or the uplink data to the eNB 200 by using the PUSCH. The uplink control signal carried by the PUCCH includes a CQI (Channel Quality Indicator), a PMI (Precoding Matrix Indicator), an RI (Rank Indicator), an SR (Scheduling Request), and an ACK/NACK. The CQI is an index indicating a downlink channel quality and is used for deciding an MCS to be used for the downlink transmission, for example. The PMI is an index indicating a precoder matrix preferably used for the downlink transmission. The RI is an index indicating the number of layers (the number of streams) available for the downlink transmission. The CQI, the PMI, and the RI are information obtained as a result of the UE 100 performing channel estimation by using a downlink reference signal, and are channel state information (CSI) indicating a downlink channel state. The SR is information for requesting allocation of an uplink radio resource (a resource block). The ACK/NACK is delivery acknowledgement information indicating whether or not downlink data is correctly received. The PUSCH mainly carries the uplink data, but can also be used for carrying the uplink control signal.

(Multicast/Broadcast Transmission)

In the LTE system, Multimedia Broadcast Multicast Service (MBMS) is defined to realize multicast/broadcast transmission.

In the MBMS, a plurality of cells use a special downlink subframe called an MBSFN (Multicast Broadcast Single Frequency Network) subframe to transmit multicast/broadcast data. Specifically, a plurality of cells belonging to the same MBSFN area transmit the same multicast/broadcast data. The UE 100 receives the multicast/broadcast data transmitted from the plurality of cells.

In such an MBMS mechanism, in addition to the MBSFN subframe being used for the MBMS, the MBSFN subframe cannot be changed dynamically. Therefore, the MBMS tends to waste a radio resource.

Figure 6:
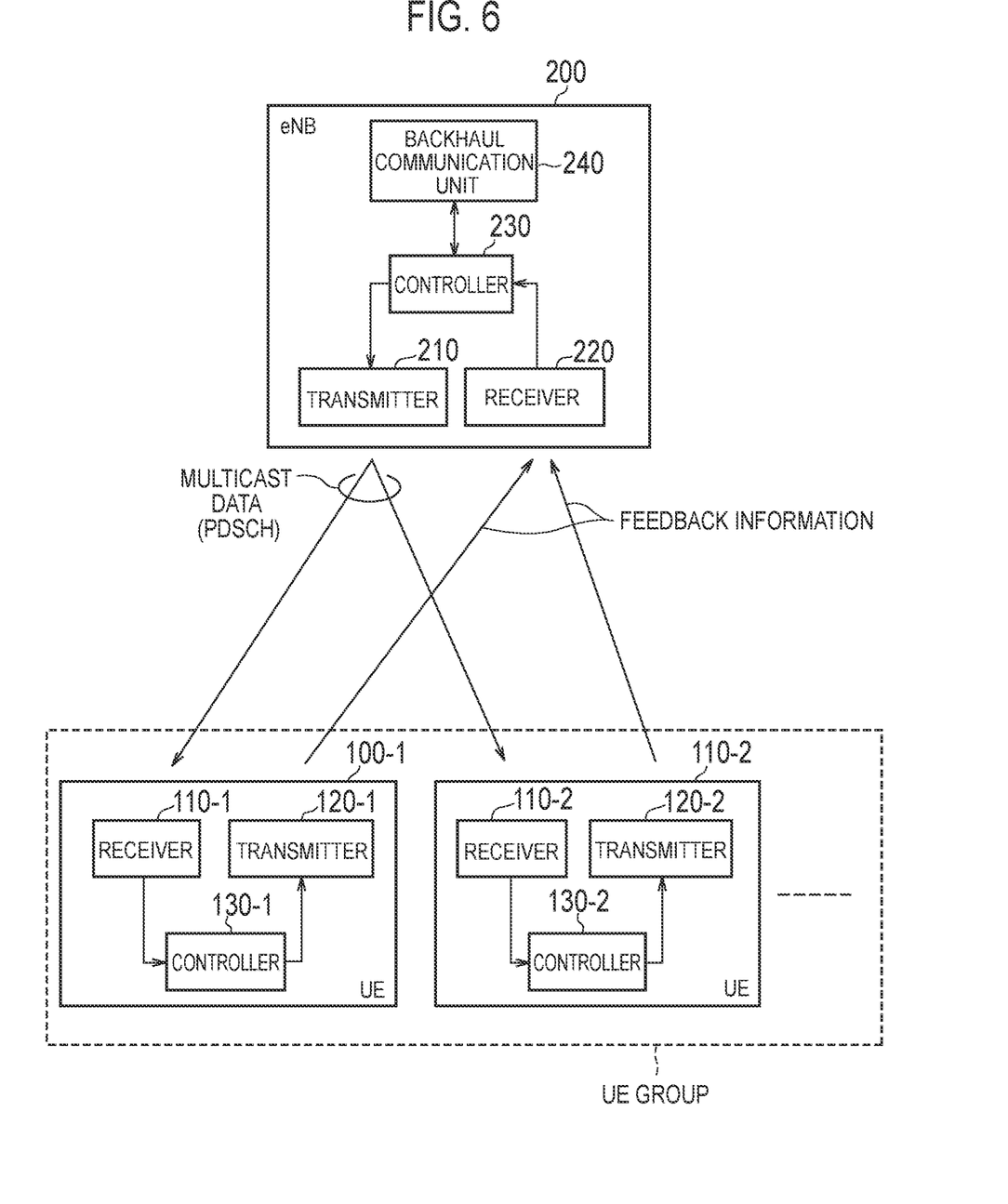
FIG. 6 is a diagram illustrating an SC-PTM related operation according to the embodiment.

On the other hand, single cell PTM transmission (SC-PTM) has been introduced to realize multicast transmission while increasing the utilization efficiency of radio resources. FIG. 6 is a diagram illustrating an SC-PTM related operation.

As illustrated in FIG. 6, in the SC-PTM, the eNB 200 uses the PDSCH to transmit multicast data by a single cell. That is, unlike the MBMS to which the multicast/broadcast transmission on an MBSFN area basis is applied, multicast/broadcast transmission per cell is applied to the SC-PTM. A plurality of UEs 100 (UE 100-1, UE 100-2 . . . ) configured to receive identical multicast data are included in a UE group. Each UE 100 in the UE group is assigned with a common group identifier (for example, a group RNTI). The group identifier is assigned by the eNB 200 (or MCE). Alternatively, the group identifier may be assigned by an entity of the core network (EPC 20). Alternatively, the group identifier may be assigned by an application server (GCS AS, for example).

The eNB 200 uses the group identifier to transmit the same downlink control signal (downlink SI or the like) and downlink data (multicast data) to each UE 100 included in the UE group. For example, the eNB 200 includes the CRC bits scrambled with the group identifier into the downlink control signal, and transmits the downlink control signal by the PDCCH. In addition, the eNB 200 uses the downlink radio resource (at least one resource block) indicated by the downlink SI to transmit the multicast data by the PDSCH.

Each UE 100 performs blind decoding on the PDCCH by descrambling the CRC bit with the group identifier to detect the downlink control signal addressed to the UE group to which the UE 100 belongs. Then, each UE 100 uses the downlink radio resource (resource block) indicated by the downlink SI to receive the multicast data.

Such a mechanism of SC-PTM can allow allocation of a resource on a resource block basis in the PDSCH. Therefore, the multicast data can be transmitted and received by using a minimum necessary radio resource, and the allocated radio resource can be changed dynamically or semi-statically. Thus, the SC-PTM is less likely to waste a radio resource than the MBMS.

(Basic Operation of Nack-Only HARQ Feedback)

In the embodiment, a feedback is introduced to the SC-PTM. In the embodiment, an example in which feedback information is delivery acknowledgment information (ACK/NACK) will be described.

First, an operation of the UE 100 will be described. Specifically, in FIG. 6, an operation between the eNB 200 and one UE 100 (for example, UE 100-1) included in the UE group will be described. In the embodiment, a case where the UE 100 configured to perform reception in the SC-PTM is in an RRC idle state is mainly assumed.

If the downlink unicast transmission is applied, the transmitter 120 of the UE 100 transmits, as the feedback information, one of an acknowledgment (ACK) indicating that the downlink data is correctly received and a negative acknowledgment (NACK) indicating that reception of the downlink data is failed, to the eNB 200. That is, if the reception of the downlink data is failed, the NACK is transmitted, and if the downlink data is correctly received, the ACK is transmitted. It is noted that that the ACK is HARQ ACK and the NACK is HARQ NACK.

On the other hand, when the SC-PTM is applied, the controller 130 stops the transmission of the ACK so that only the NACK, out of the ACK and the NACK, is transmitted as the feedback information to the eNB 200. That is, if the reception of the downlink data (multicast data) is failed, the NACK is transmitted, but the ACK is not transmitted even if the downlink data (multicast data) is correctly received.

In this way, when only the NACK is used as the delivery acknowledgment information for the SC-PTM, it is possible to save the uplink radio resource (for example, the PUCCH resource) associated with the transmission of the ACK.

Further, if the SC-PTM is applied, the transmitter 120 of the UE 100 uses a radio resource (resource element) common to a plurality of UEs 100 (UE group) configured to perform the SC-PTM with the eNB 200 and a signal sequence (base sequence) common thereto to transmit the NACK. Specifically, such a common resource is allocated to each UE group from the eNB 200, and the UE 100 transmits the NACK by using the common resource of the UE group to which the UE 100 belongs. Such a common resource allocation may be designated by broadcasting by system information (SIB: System Information Block), or may be designated by the DCI at the time of SC-PTM allocation in the PDCCH.

As a result, it is also possible to save the uplink radio resource (for example, the PUCCH resource) associated with the transmission of the NACK.

It is noted that when the NACK using such a common resource is applied, the NACKs of the plurality of UEs 100 are combined. As a result, the eNB 200 cannot identify the UE from which the NACK is transmitted. However, when retransmission is performed by multicast to each UE 100 in the group, it is not necessary to identify from which UE 100 the NACK is transmitted.

Further, it is preferred that if the SC-PTM is applied, the transmitter 120 of the UE 100 transmits a demodulation reference signal (DMRS) of the NACK by using a radio resource common to the plurality of UEs 100 and a signal sequence common thereto. As a result, the NACK is successfully demodulated in the eNB 200. Such a common resource allocation may be designated by broadcasting by the system information (SIB), or may be designated by the DCI at the time of the SC-PTM allocation in the PDCCH. It is noted that the "DMRS of the NACK" means DMRS accompanying the NACK, and refers to DMRS different from the NACK. Alternatively, if the NACK is included in a DMRS sequence, the "DMRS of the NACK" refers to DMRS including the NACK.

Next, an operation of the eNB 200 will be described. If the downlink unicast transmission is applied, the receiver 220 of the eNB 200 receives, as the feedback information, one of the ACK indicating that the downlink data is correctly received and the NACK indicating that reception of the downlink data is failed, from the UE 100. On the other hand, if the SC-PTM is applied, the receiver 220 of the eNB 200 receives only the NACK, out of the ACK and the NACK, from the UE 100, as the feedback information.

If the SC-PTM is applied, the controller 230 of the eNB 200 allocates a common radio resource and a common signal sequence for transmitting the NACK, to the plurality of UEs 100 (UE group) configured to perform the SC-PTM with the eNB 200. Specifically, such a common resource is allocated to each UE group. Further, it is preferable that if the SC-PTM is applied, the controller 230 of the eNB 200 allocates a common radio resource and a common signal sequence for transmitting the demodulation reference signal (DMRS) of the NACK, to the plurality of UEs 100.

Figure 7:
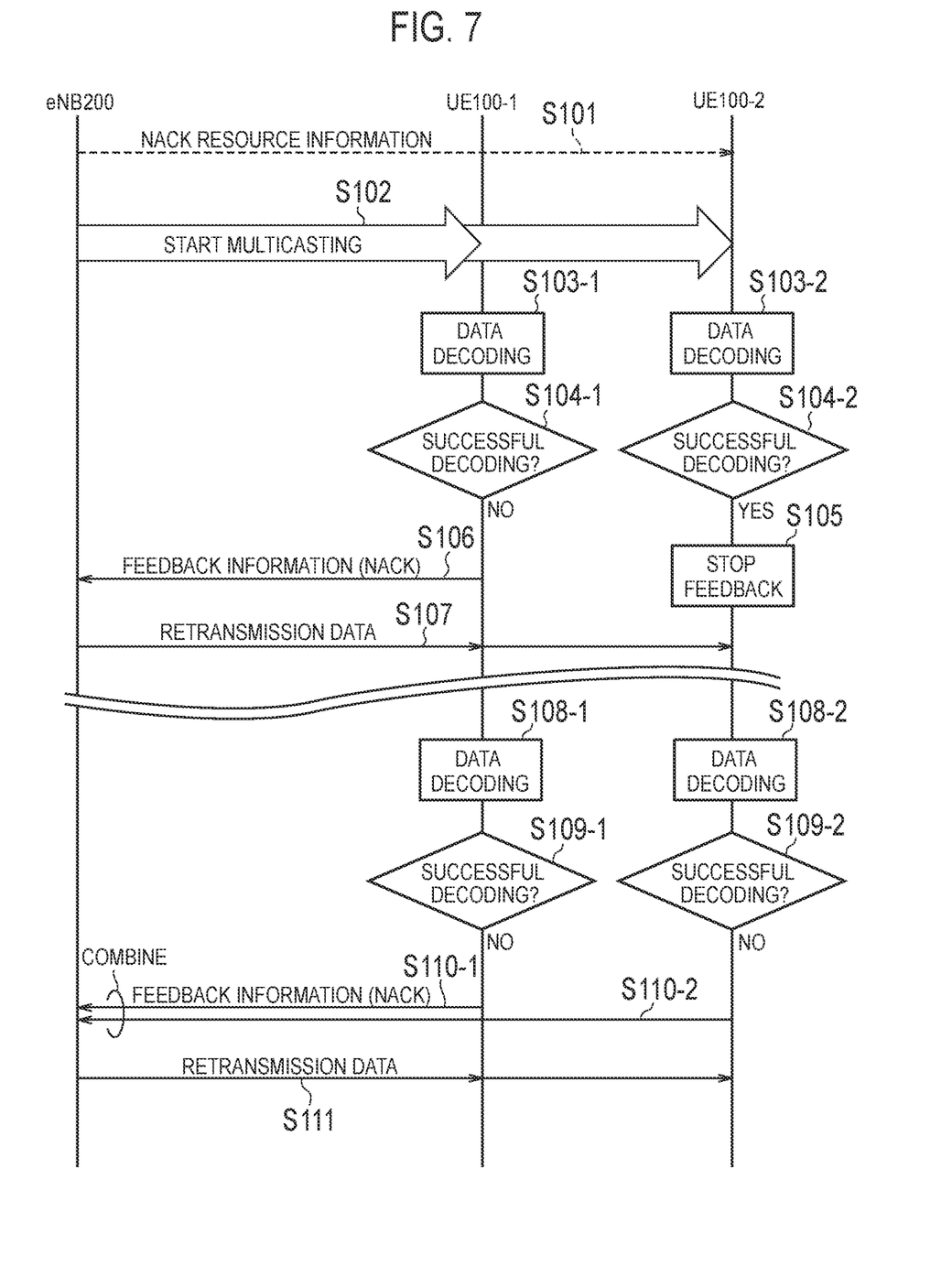
FIG. 7 is a diagram illustrating an example of an operation sequence according to the embodiment.

Next, an example of an operation sequence will be described. FIG. 7 is a diagram illustrating an example of the operation sequence according to the embodiment.

As illustrated in FIG. 7, in step S101, the eNB 200 transmits setting information on the common resource for transmitting the NACK to the UE 100 in the group (the UE 100-1, the UE 100-2). The setting information on the common resource for transmitting the NACK may be transmitted by broadcasting from the eNB 200 by the system information (SIB), or transmitted by unicasting from the eNB 200 by an individual RRC message. Each UE 100 receives the setting information to be stored.

In step S102, the eNB 200 starts the multicast transmission by the SC-PTM.

In step S103, the UE 100 (the UE 100-1, the UE 100-2) attempts to decode the received multicast data.

In step S104, the UE 100 (the UE 100-1, the UE 100-2) confirms whether or not the decoding of the multicast data is successful. Here, it is assumed that the UE 100-1 fails in decoding and the UE 100-2 succeeds in decoding.

In step S105, the UE 100-2 stops transmitting the feedback information (NACK) to the eNB 200.

On the other hand, in step S106, the UE 100-1 transmits the NACK to the eNB 200 by using the common resource for transmitting the NACK.

In step S107, the eNB 200 transmits the retransmission data to the UE 100 in the group (the UE 100-1, the UE 100-2) in response to the reception of the NACK.

Thereafter, in step S108, the UE 100 (the UE 100-1, the UE 100-2) confirms whether or not the decoding of the newly received multicast data is successful. Here, it is assumed that both the UE 100-1 and the UE 100-2 fail in decoding (S 109: NO).

In step S110, the UE 100-1 and the UE 100-2 transmit the NACK to the eNB 200 by using a common resource for transmitting the NACK. These NACKs are received by the eNB 200 in a combined state.

In step S111, the eNB 200 transmits the retransmission data to the UE 100 in the group (the UE 100-1, the UE 100-2) in response to the reception of the NACK.

In this way, when only the NACK is used as the delivery acknowledgment information for the SC-PTM, it is possible to save the uplink radio resource (for example, the PUCCH resource) associated with the transmission of the ACK. Thus, the UE 100 uses the common resource for each UE group to transmit the NACK, and thus it is possible to save an uplink radio resource generated along with the transmission of the NACK.

(Transmission Parameter of Nack-Only HARQ Feedback)

As described above, according to the Nack-only HARQ feedback, from among the UEs 100 having received the multicast, all the UEs 100 that failed in the reception feed back the NACK information to the eNB 200 with the same resource and the same signal sequence, and the eNB 200 can perform the reception in a similar manner to a multipath combining. In addition, it is unnecessary to set a resource and signal sequence for each UE, so that even a UE 100 in an RRC idle state can perform the feedback transmission.

A transmission parameter of the NACK-only HARQ feedback will be described, below. In the embodiment, a UE 100 configured to perform an SC-PTM reception in an RRC idle state autonomously determines a transmission parameter to be used for transmitting a NACK, and uses the determined transmission parameter to transmit the NACK. Here, "autonomously determining a transmission parameter" means that the UE 100 determines the transmission parameter without depending on the UE-specific setting parameter (for example, dedicated RRC signaling) from the eNB 200. "Autonomously determining a transmission parameter" may include the UE 100 determining the transmission parameter by using a common configuration parameter (for example, broadcast RRC signaling) from the eNB 200.

(1) Timing Advance Value

In the Nack-only HARQ feedback, even the UE 100 in the RRC idle state can perform the feedback transmission, but a feedback timing needs to be uniform. Specifically, as the UE 100 is closer to a cell edge, it is necessary to advance an uplink transmission timing to compensate the propagation delay. In the LTE system, such a transmission timing adjustment is performed by using a timing advance (TA) value. The TA value is a value indicating a degree by which the uplink timing is advanced based on the downlink timing.

In the embodiment, the UE 100 measures the received power of the reference signal received from the eNB 200 and compares the measured received power with a threshold. Then, the UE 100 autonomously determines the TA value, based on the comparison result between the measured received power and the threshold value. The UE 100 adjusts the timing of transmitting the NACK to the eNB 200 by using the determined TA value. The received power of the reference signal is referred to as "RSRP (Reference Signal Received Power)", and the threshold value is referred to as "RSRP threshold value" below.

In step S101 of FIG. 7, the eNB 200 may notify, by SIB, the UE 100 of a corresponding relationship between the RSRP threshold value and the TA value. Such a SIB may be a SIB type 20 (SIB 20) that is a SIB for SC-PTM. Alternatively, the eNB 200 may transmit the corresponding relationship between the RSRP threshold value and the TA value by SC-MCCH (Single Cell Multicast Control Channel). However, the corresponding relationship between the RSRP threshold value and the TA value may be previously set to the UE 100.

Figure 8:
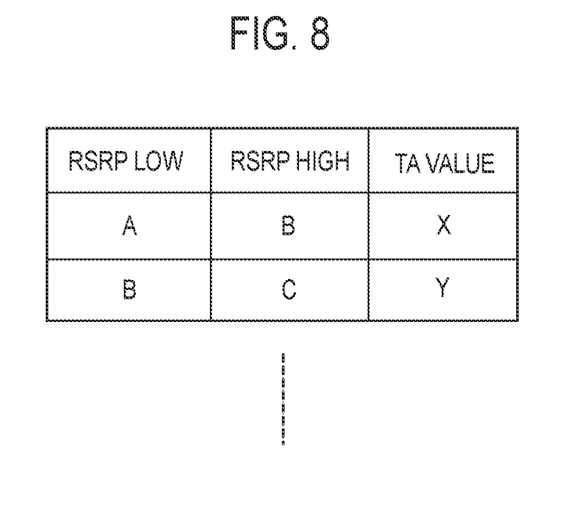
FIG. 8 is a diagram illustrating a corresponding relationship between an RSRP threshold value and a TA value according to the embodiment.

FIG. 8 is a diagram illustrating the corresponding relationship between the RSRP threshold value and the TA value. As illustrated in FIG. 8, a first RSRP threshold value (RSRP Low) and a second RSRP threshold value (RSRP High) are associated with each of a plurality of TA values. For each of the plurality of TA values, the UE 100 checks whether RSRP (measured RSRP) measured by the UE 100 is within a range of the first and second RSRP thresholds. When the measured RSRP is within the range of the first and second RSRP threshold values, the TA value corresponding to the first and second RSRP threshold values is determined as the TA value used for the NACK transmission. Specifically, the UE 100 determines the TA value that satisfies "RSRP Low≤measured RSRP<RSRP High" as the TA value used for the NACK transmission.

Although an example using the RSRP has been described here, a path loss may be used. The path loss is a difference between the transmission power of the reference signal and the received power thereof. For example, the UE 100 subtracts the measured RSRP from the reference signal transmission power notified in advance from the eNB 200 or the known reference signal transmission power to obtain the result as the path loss.

Instead of the method using the corresponding relationship as illustrated in FIG. 8, a predetermined mathematical expression may be employed. A method using a predetermined mathematical expression will be described, below.

For a path loss PL [dB] and a distance d [m], a path loss model of "PL=$\alpha+\beta$ log (d)" is assumed. Since TA (TA value) is proportional to the distance d, $$TA=\gamma \exp\{(PL-\alpha)/\beta\}=\exp\{(PL-\alpha)/\delta\}$$

Thus, the calculation formula can be defined with two values of $\alpha$ and $\delta$.

Also, since RSRP is "transmission power P—path loss PL", the following can be established:

$$TA=\exp\{(P-RSRP-\alpha)/\delta\} \quad (1)$$

$$TA=\exp\{(\varepsilon-RSRP)/\delta\} \quad (2)$$

When known P is used as in Equation (1), $\alpha$ and $\delta$ are notified from the eNB 200 to the UE 100 by broadcasting. On the other hand, when Equation (2) is used, $\varepsilon$ and $\delta$ are notified from the eNB 200 to the UE 100 by broadcasting. The UE 100 calculates TA by using Equation (1) or Equation (2).

(2) Path Loss Compensation Coefficient, Transmission Bandwidth

The eNB 200 having received the NACK desirably can estimate an approximate number of the UEs 100 having transmitted the NACK, based on the receiving strength (received power) of the NACK. Based on the approximate number of UEs 100 having transmitted the NACK, the eNB 200 can, for example, adjust the MCS of the SC-PTM transmission. In order to enable estimation of the number of UEs in the eNB 200, it is necessary that the receiving strengths from the respective UEs 100 are uniform. In other words, received signals from the UEs 100 with different path losses need to be uniform.

In the embodiment, the UE 100 determines a predetermined path loss compensation coefficient as a path loss compensation coefficient for determining the transmission power of the NACK. The transmission power P of the UE 100 is determined by using the following Equation (3), for example, wherein the number of allocated RBs is M, the target power is $P_0$, the path loss is PL, and the UE maximum transmission power is $P_{CMAX}$.

$$P = \text{Min}(P_{CMAX}, 10 \log M + P_0 + \alpha PL) \quad (3)$$

Here, the predetermined path loss compensation coefficient $\alpha$ is "1" or substantially "1". In other words, the UE 100 determines the transmission power to maximally compensate the path loss between the UE 100 and the eNB 200. It is noted that the value of the path loss compensation coefficient in an RRC connected state is generally set to a value less than 1 in order to suppress interference to an adjacent cell.

In the embodiment, the UE 100 determines a predetermined transmission bandwidth as the transmission bandwidth of the NACK. The predetermined transmission bandwidth is about one RB or about two RBs. That is, the UE 100 performs narrowband transmission of the NACK. When the UE 100 is located at a cell edge, if the NACK is transmitted with a wide frequency bandwidth, the transmission power of the UE 100 is saturated and it is not possible to secure a sufficient transmission power (transmission power density). Therefore, the UE 100 can secure a sufficient transmission power by performing the narrowband transmission of the NACK.

(3) Cyclic Shift

As described above, the eNB 200 having received the NACK desirably can estimate an approximate number of the UEs 100 having transmitted the NACK, based on the receiving strength (received power) of the NACK. However, due to a phase rotation of the signal from each UE 100, in-phase combining, inverse-phase combining and the like coexist, so that there is no statistical convergence of the received power unless there are sufficient samples.

Figure 9:
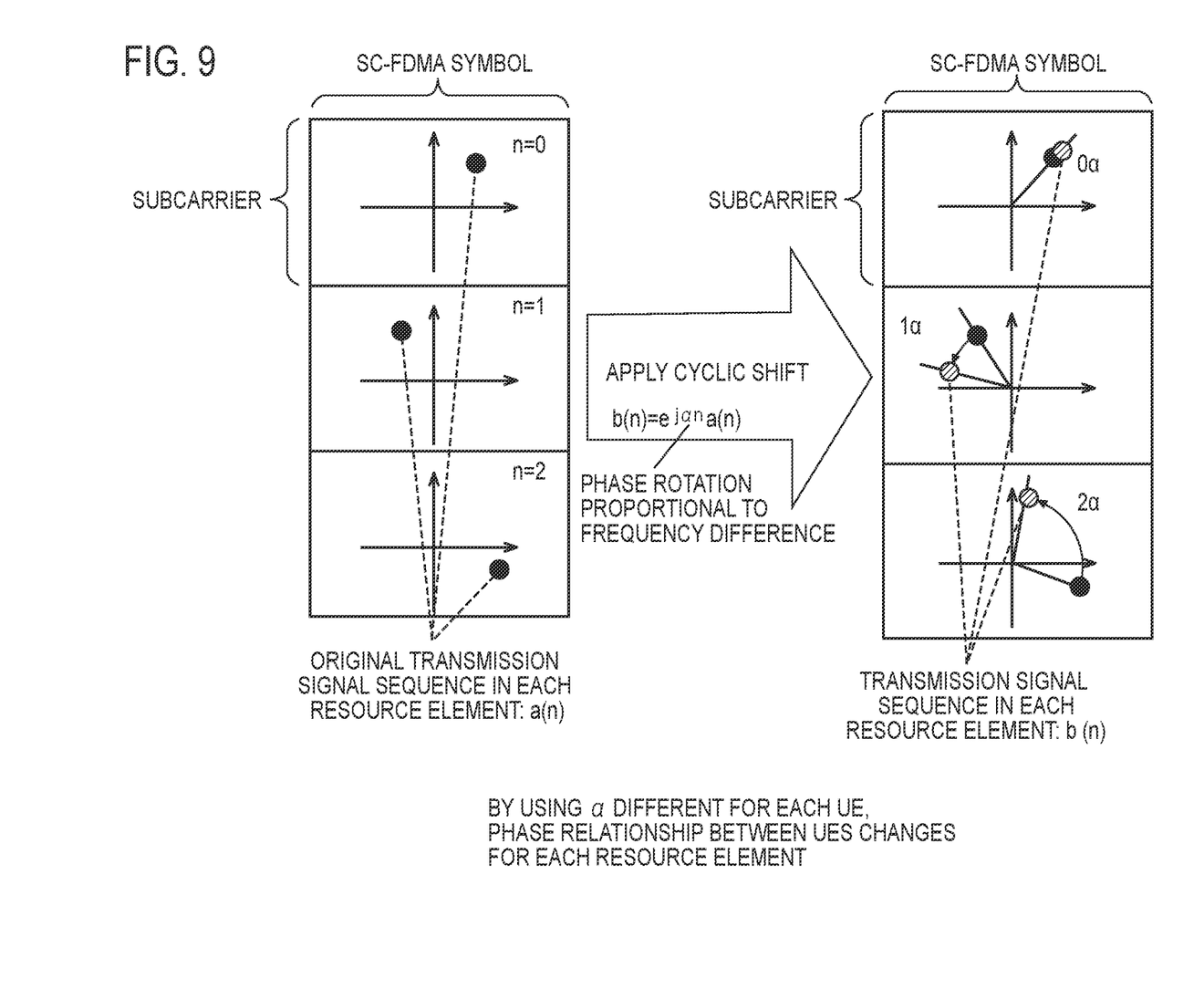
FIG. 9 is a diagram illustrating a frequency expression of a cyclic shift according to the embodiment.
Figure 10:
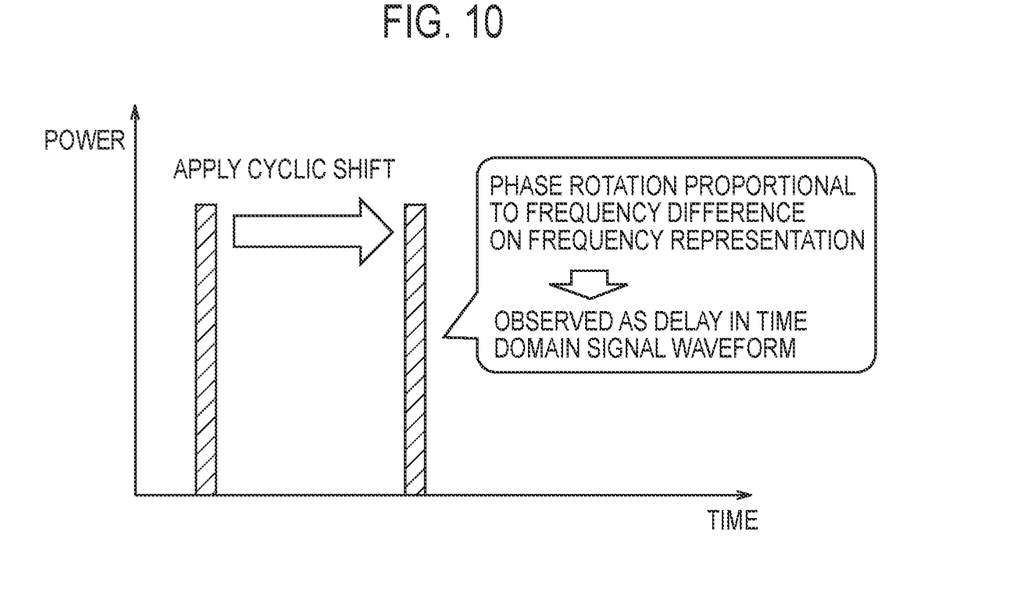
FIG. 10 is a diagram illustrating a time expression of the cyclic shift according to the embodiment.

In the embodiment, the UE 100 autonomously determines a cyclic shift to be applied to the NACK. FIG. 9 is a diagram illustrating a frequency representation of the cyclic shift. In FIG. 9, the value of "n" indicates a transmission signal sequence for each resource element. The cyclic shift can be defined as a phase rotation proportional to a frequency difference in a frequency domain. FIG. 10 is a diagram illustrating a time expression of the cyclic shift. As illustrated in FIG. 10, the cyclic shift can be defined as a delay time in a time domain.

The UE 100 determines the cyclic shift, based on a random value. Specifically, the UE 100 generates a random number or a pseudo random number and applies the generated random number or pseudo random number, as the cyclic shift, to the NACK signal. In order to smooth an influence due to instantaneous fading between the UEs, each UE needs to perform broadband transmission. However, if the random number-based cyclic shift is introduced, a sufficient statistics effect can be obtained even in the narrowband transmission as described above.

Alternatively, the UE 100 determines the cyclic shift, based on an attribute of the UE 100. The attribute may be a geographical position of the UE 100. The geographical position may be a longitude and a latitude, or may be an index of the longitude and the latitude. Such an index may be referred to as "zone". The UE 100 may determine, as the cyclic shift, a value obtained by substituting information indicating the geographical position into a predetermined calculation formula. Alternatively, the attribute may be identification information possessed by the UE 100. The identification information of the UE 100 is, for example, an IMSI (International Mobile Subscriber Identity) or S-TMSI (SAE Temporary Mobile Subscriber Identity). The IMSI is information stored in a UIM card. The S-TMSI is information assigned from the MME 300 to the UE 100 when the UE 100 performs location registration on the network. The UE 100 may determine, as the cyclic shift, the value obtained by substituting the identification information into the predetermined calculation formula. If the cyclic shift is determined based on these attributes, the eNB 200 may specify the cyclic shift corresponding to the received NACK. Then, the eNB 200 may determine, based on the specified cyclic shift, the attribute of the UE 100 having transmitted the NACK.

Although an example using the cyclic shift has been described here, a transmission power for each subcarrier may be used instead of the cyclic shift. The UE 100 autonomously determines a transmission power for each subcarrier, based on a random value or an attribute of the UE 100.

(4) Time-Frequency Resource

As described above, the eNB 200 having received the NACK can desirably estimate an approximate number of the UEs 100 having transmitted the NACK, based on the receiving strength (received power) of the NACK. Also, the eNB 200 can desirably estimate an approximate position of the UE 100 having transmitted the NACK.

In the embodiment, the UE 100 measures the received power (RSRP) of the reference signal received from the eNB 200 and compares the measured RSRP with the RSRP threshold value. Then, the UE 100 autonomously determines a time-frequency resource to be used for transmitting the NACK, based on the comparison result between the measured RSRP and the RSRP threshold value. The UE 100 transmits the NACK to the eNB 200 by using the determined time-frequency resource.

In step S101 of FIG. 7, the eNB 200 may transmit, by the SIB, the corresponding relationship between the RSRP threshold value and the time-frequency resource, to the UE 100. Such a SIB may be a SIB type 20 (SIB 20) that is a SIB for SC-PTM. Alternatively, the eNB 200 may transmit the corresponding relationship between the RSRP threshold value and the time-frequency resource by the SC-MCCH. However, the corresponding relationship between the RSRP threshold value and the time-frequency resource may be previously set to the UE 100.

Figure 11:
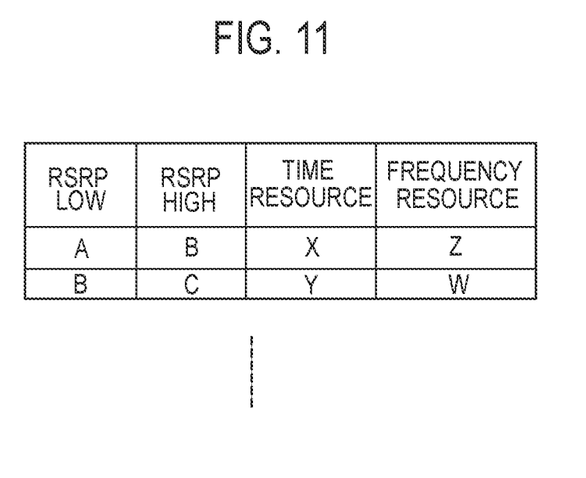
FIG. 11 is a diagram illustrating a corresponding relationship between the RSRP threshold value and a time-frequency resource according to the embodiment.

FIG. 11 is a diagram illustrating a corresponding relationship between the RSRP threshold value and the time-frequency resource. As illustrated in FIG. 11, the first RSRP threshold value (RSRP Low) and the second RSRP threshold value (RSRP High) are associated with each of a plurality of time-frequency resources. The time-frequency resource is configured of a combination of a time resource and a frequency resource. The time resource is identified by at least one of a system frame number, a subframe number, a slot number, and a symbol number. The frequency resource is identified by at least one of a carrier frequency number, a resource block number, and a subcarrier number. Irrespective of a case where a resource is specified by such a number, a resource range (a time range and a frequency range) may be specified.

For each of the plurality of time-frequency resources, the UE 100 checks whether RSRP (measured RSRP) measured by the UE 100 is within a range of the first and second RSRP thresholds. When the measured RSRP is within the range of the first and second RSRP threshold values, the time-frequency resource corresponding to the first and second RSRP threshold values is determined as the time-frequency resource used for the NACK transmission. Specifically, the UE 100 determines the time-frequency resource satisfying "RSRP Low≤Measured RSRP<RSRP High" as the time-frequency resource used for the NACK transmission. Although an example using the RSRP has been described here, a path loss may be used. It is noted that the path loss threshold value may be used instead of the RSRP threshold value.

Further, in addition to determining the time-frequency resource according to the path loss (path loss threshold value), the following transmission power control may be employed. Specifically, in a transmission power calculation formula such as Equation (3), the target power $P_0$ is determined based on the path loss threshold value. The eNB 200 notifies, by SIB, the UE 100 of the corresponding relationship between the path loss threshold value and the target power. For example, if PL0≤PL<PL1, then X0 is true, and if PL1≤PL<PL2, the X1, . . . is true. Here, PL1, PL2, . . . are the path loss threshold values, and X0, X1 . . . are the target power. The UE 100 compares the calculated path loss with the path loss threshold value and selects an appropriate target power. Then, the UE 100 determines the transmission power of the UE 100, based on the selected target power. This makes it possible to make the received power from each UE 100 in the eNB 200 in the resource according to the path loss uniform while setting X0≥X1, so that the transmission power of the cell edge UE does not become too large.

The eNB 200 may specify a time-frequency resource corresponding to the received NACK. Then, the eNB 200 may determine an approximate position of the UE 100 having transmitted the NACK, based on the specified time-frequency resource.

It is noted that although an example of determining the time-frequency resource based on the RSRP or the path loss has been described here, the time-frequency resource may be also determined based on the attribute information (particularly, the identification information) of the UE 100 as described in "(3) Cyclic shift". The UE 100 may determine the time-frequency resource, based on a value obtained by substituting the identification information of the UE 100 into a predetermined calculation formula. The eNB 200 may specify the time-frequency resource corresponding to the received NACK to estimate the UE 100 having transmitted the NACK, based on the specified time-frequency resource.

Other Embodiments

In the above-described embodiment, the case where the UE 100 configured to perform the SC-PTM reception is in the RRC idle state (specific state) is mainly assumed. However, the UE 100 configured to perform the SC-PTM reception may be in a Light connected state (specific state). The Light connected state is a state in which signaling between the UE 100 and the network is reduced as compared with that in the RRC connected state while the context state of the UE 100 is held in the network.

In the above-described embodiment, the case where the feedback information on the downlink is the delivery acknowledgment information (ACK/NACK) has mainly been assumed. However, the feedback information may be channel state information (CSI).

In the above-described embodiment, an example of introducing the feedback (NACK-only HARQ feedback) to the SC-PTM has been described. However, the present invention is not limited to the SC-PTM. For example, the present invention may be applied to a case where the feedback is introduced to the MBMS. Also, the present invention may be applied to the multicast/broadcast transmission other than the SC-PTM and MBMS, in addition to the case where the feedback is introduced to the SC-PTM or the MBMS. Alternatively, a method may be employed in which the NACK feedback is performed only under a predetermined condition (such as a case that the UE 100 is instructed through the SIB, the DCI or the like from the eNB 200).

In the above-described embodiment, the LTE system is exemplified as the mobile communication system. However, the present invention is not limited to the LTE system. The present invention may apply to systems other than the LTE system.

CROSS REFERENCE

The present application claims priority of Japanese Patent Application No. 2016-149053 (filed on Jul. 28, 2016), and the entire content thereof is incorporated herein.

The invention claimed is:

1. A radio terminal comprising:
a controller configured to perform a process of: receiving, if the radio terminal is in a specific state different from an RRC connected state, multicast/broadcast data transmitted from a base station; and transmitting feedback information on the multicast/broadcast data to the base station, wherein
the controller is configured to autonomously determine a transmission parameter to be used for transmitting the feedback information and transmits the feedback information by using the determined transmission parameter, wherein
the controller is further configured to perform processes of:
  measuring received power of a reference signal received from the base station;
  comparing a value of the measured received power with a first threshold value and a second threshold value;
  autonomously selecting as the transmission parameter, a timing advance value or a time-frequency resource associated with the first and second threshold values, when it is determined that the measured received power falls within a range of the first and second threshold values; and
  transmitting the feedback information using the timing advance value or the time-frequency resource selected on the basis of the comparison.

2. The radio terminal according to claim 1, wherein the specific state is an RRC idle state.

3. The radio terminal according to claim 1, wherein the feedback information includes a negative acknowledgment indicating that reception of the multicast/broadcast data is failed, and
the controller is configured to control not to transmit an acknowledgment indicating the success to the base station even if the controller succeeds in receiving the multicast/broadcast data.

4. The radio terminal according to claim 3, wherein the controller is configured to perform a process of transmitting the negative acknowledgment by using a time-frequency resource common to a plurality of radio terminals and a signal sequence common to the plurality of radio terminals.

5. The radio terminal according to claim 1, wherein
the transmission parameter includes a transmission power, and
the controller is configured to
  determine the transmission power based on the result of the comparison, and
  transmit the feedback information by using the determined transmission power.

6. The radio terminal according to claim 1, wherein
the transmission parameter includes a path loss compensation coefficient for determining a transmission power,
the controller is configured to determine a predetermined path loss compensation coefficient as the path loss compensation coefficient, and
the controller is configured to determine the transmission power to maximally guarantee a path loss between the controller and the base station, based on the predetermined path loss compensation coefficient.

7. The radio terminal according to claim 1, wherein
the transmission parameter includes a cyclic shift to be applied to the feedback information.

8. The radio terminal according to claim 1, wherein
the transmission parameter includes a transmission power for each subcarrier to be applied to the feedback information.

9. The radio terminal according to claim 1, wherein
the controller is configured to determine the transmission parameter based on a random value.

10. The radio terminal according to claim 1, wherein
the controller is configured to determine the transmission parameter based on an attribute of the radio terminal.

11. A method for a radio terminal, comprising:
if the radio terminal is in a specific state different from an RRC connected state,
  receiving, by the radio terminal, multicast/broadcast data transmitted from a base station;
  autonomously determining, by the radio terminal, a transmission parameter to be used for transmitting feedback information on the multicast/broadcast data; and
  transmitting, by the radio terminal, the feedback information to the base station by using the determined transmission parameter, wherein
the autonomously determining includes
  measuring received power of a reference signal received from the base station;
  comparing a value of the measured received power with a first threshold value and a second threshold value; and
  autonomously selecting as the transmission parameter, a timing advance value or a time-frequency resource associated with the first and second threshold values, when it is determined that the measured received power falls within a range of the first and second threshold values, and wherein
the transmitting includes
  transmitting the feedback information using the timing advance value or the time-frequency resource selected on the basis of the comparison.

12. A system comprising a radio terminal and a base station, wherein
the radio terminal includes
  a controller configured to perform a process of: receiving, if the radio terminal is in a specific state different from an RRC connected state, multicast/broadcast data transmitted from the base station; and transmitting feedback information on the multicast/broadcast data to the base station, wherein
the controller is configured to autonomously determine a transmission parameter to be used for transmitting the feedback information and transmits the feedback information by using the determined transmission parameter, and wherein
the controller is further configured to perform processes of:
  measuring received power of a reference signal received from the base station;
  comparing a value of the measured received power with a first threshold value and a second threshold value;
  autonomously selecting as the transmission parameter, a timing advance value or a time-frequency resource associated with the first and second threshold values, when it is determined that the measured received power falls within a range of the first and second threshold values; and
  transmitting the feedback information using the timing advance value or the time-frequency resource selected on the basis of the comparison.

* * * * *